No. 12,166. REISSUED NOV. 3, 1903.
H. MÖLLER.
NIGHT LAMP.
APPLICATION FILED APR. 28, 1903.
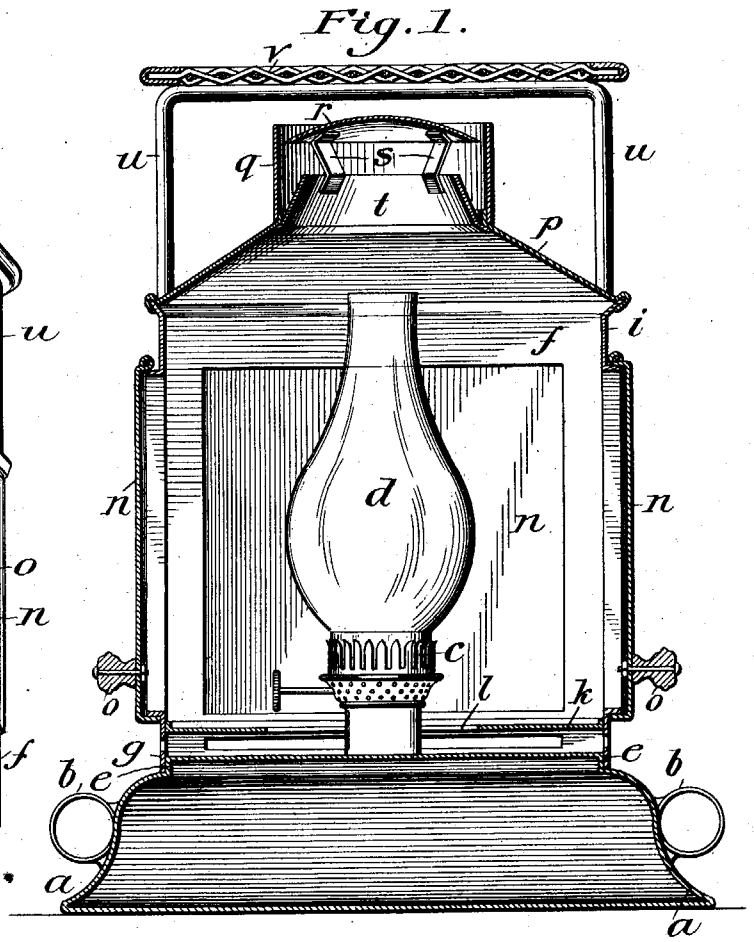
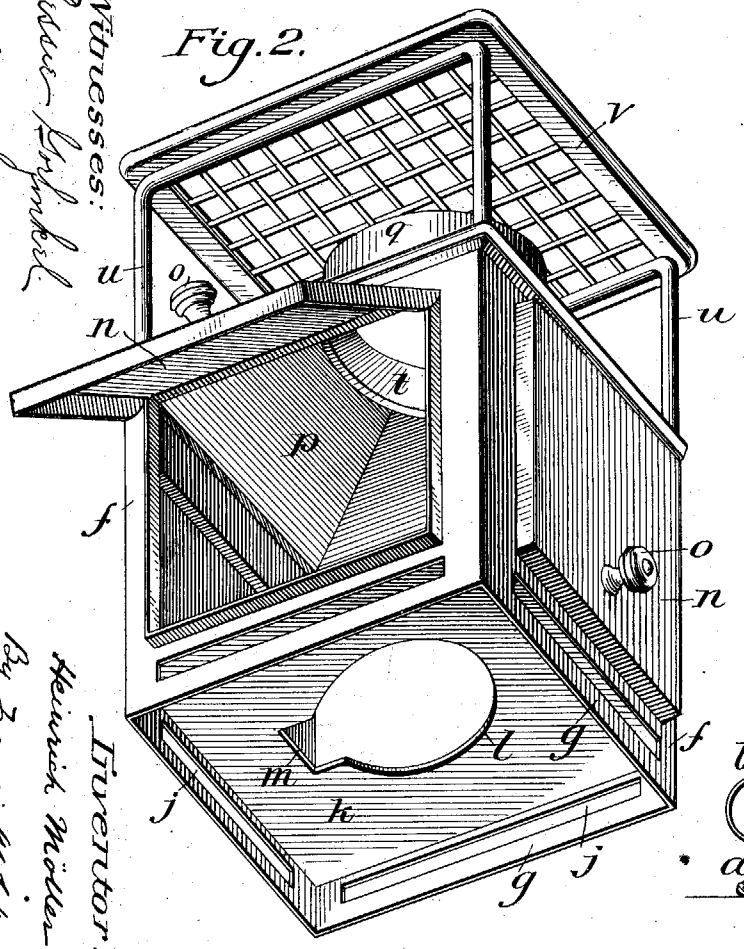
Witnesses:
Pesse Grünkel
K Lockwood Nevins.
Inventor:
Heinrich Möller
By Francis M. Wright
Atty.
THE NORRIS PETERS CO., PHOTO-LITHO., WASHINGTON, D. C.

No. 12,166. Reissued November 3, 1903.

UNITED STATES PATENT OFFICE.

HEINRICH MÖLLER, OF SAN FRANCISCO, CALIFORNIA.

NIGHT-LAMP.

SPECIFICATION forming part of Reissued Letters Patent No. 12,166, dated November 3, 1903.

Original No. 672,328, dated April 16, 1901. Application for reissue filed April 28, 1903. Serial No. 154,730.

*To all whom it may concern:*

Be it known that I, HEINRICH MÖLLER, a citizen of the United States, residing at San Francisco, in the county of San Francisco and State of California, have invented certain new and useful Improvements in Night-Lamps, of which the following is a specification.

My invention relates to improvements in night-lamps, the object of my invention being to provide a lamp and a cover therefor which shall be convenient for use in bed-rooms, especially when it is desired to warm artificial food for infants or invalids.

One of the principal objects of my invention has been to provide a lamp which can be so used to provide a gentle heat for warming the food and at the same time the light of which can be entirely excluded from the room, if desired, or the light can be directed to any desired portion of the room at pleasure without rising from the bed if the lamp is placed upon a suitable stand by the side of the bed.

My invention therefore resides in the novel construction, combination, and arrangement of parts for the above ends hereinafter fully specified, and particularly pointed out in the claims.

In the accompanying drawings, Figure 1 is a central vertical section of the lamp, certain of the parts being shown in elevation; and Fig. 2 is a perspective view of the cover of the lamp removed from the lamp-body.

Referring to the drawings, *a* represents the base of the lamp, provided on opposite sides with the handles *b*. *c* represents the burner, and *d* the chimney thereof. The base *a* is square in form and has four short vertical walls *e*, forming guides for the four walls *i* of a casing *f*. The lower edges *g* of the walls of said casing rest upon the extended portion of the base *a* beyond the short walls *e*. Each wall *i* of the casing has a horizontal slot *j*, extending almost the whole width of the wall, and the lower edges of the slots are about on a level with the tops of the walls *e* of the base. These slots provide air-openings for supplying air to the lamp. Said walls *i* are connected by a base *k*, which has a central circular aperture *l*, adapted to pass down over the chimney of the lamp, said aperture having a lateral extension *m* to pass over the end of the stem by which the wick is raised. Each wall of the casing has a large opening extending almost entirely across the wall, said opening being closed by means of a cover *n*, hinged at the top and provided with a handle *o* for raising said cover. By means of these covers the light of the lamp can be completely excluded from the room when desired, or by raising one or more of said covers any part or parts of the room may be illuminated. Moreover, the covers can be placed to extend downwardly at an angle, so as to throw the light downward and illuminate only the lower portion of the room. Said casing is formed with a sloping roof *p*, having a cylindrical flue *q* and a curved circular hood *r*, supported by legs *s* upon a frusto-conical extension *t* from the roof *p* within the flue *q*. By this means light is absolutely prevented from escaping from the top of the casing, although the products of combustion are allowed free exit therethrough.

From the four corners of the roof *p* extend two bail-like supports *u* of the stand *v*, composed of wire grating. Upon said stand can be placed a small cup or other vessel containing food which it is desired to keep warm by means of the heat of the lamp.

I claim—

1. In a night-lamp, the combination with a lamp-body having a plurality of short vertical walls *e* at its top, of a casing having an equal number of walls, and a base suitably apertured to pass down over the chimney of the lamp, the lower edge of said walls below said base fitting snugly against the walls *e* of the body of the lamp, and said walls being suitably apertured between said lower edges and the base *k* to admit air for combustion, each wall having a large opening above said base, said opening being closed by means of a cover hinged at the top, the top of the casing having a suitable hood for stopping the passage of light upward from the lamp, while permitting free exit of the products of combustion, said casing having also above said hood, a grating supported from the top of the casing at a distance from the top of said hood, substantially as described.

2. A night-lamp having a support for a heating vessel and having a passage for the products of combustion discharging said products directly upward against the under side of the vessel so supported, said passage being sufficiently tortuous to prevent passage of light from the lamp, and the outer material of said passage being opaque, substantially as described.

3. A night-lamp having a support for a heating vessel and having a passage for the products of combustion discharging said products directly upward against the under side of the vessel so supported, said passage being sufficiently tortuous to prevent passage of light from the lamp, and the outer material of said passage being opaque, said lamp having also an opaque apertured inclosure preventing passage of light therefrom, and a shutter removably closing said aperture, substantially as described.

HEINRICH MÖLLER.

Witnesses:
FRANCIS M. WRIGHT,
BESSIE GORFINKEL.